United States Patent
Juma et al.

(10) Patent No.: US 11,283,629 B2
(45) Date of Patent: Mar. 22, 2022

(54) AUTOMATED REPLACEMENT OF RENEWABLE SERVER CERTIFICATES

(71) Applicant: Red Hat, Inc., Raleigh, NC (US)

(72) Inventors: Farah Juma, Toronto (CA); Darren Andrew Lofthouse, Biggleswade (GB)

(73) Assignee: Red Hat, Inc., Raleigh, NC (US)

( * ) Notice: Subject to any disclaimer, the term of this patent is extended or adjusted under 35 U.S.C. 154(b) by 186 days.

(21) Appl. No.: 16/598,397

(22) Filed: Oct. 10, 2019

(65) Prior Publication Data
US 2021/0111907 A1      Apr. 15, 2021

(51) Int. Cl.
*H04L 9/32* (2006.01)
*H04L 9/08* (2006.01)
*H04L 29/06* (2006.01)

(52) U.S. Cl.
CPC .......... *H04L 9/3268* (2013.01); *H04L 9/0891* (2013.01); *H04L 63/0428* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 8,321,662 B2 | 11/2012 | Hazlewood et al. | |
| 9,197,630 B2 | 11/2015 | Sharif et al. | |
| 10,044,511 B2 | 8/2018 | Gunti et al. | |
| 2017/0033935 A1* | 2/2017 | Clark | H04L 9/3265 |
| 2017/0171191 A1 | 6/2017 | Cignetti et al. | |
| 2018/0060608 A1 | 3/2018 | Holden | |

FOREIGN PATENT DOCUMENTS

| | | |
|---|---|---|
| WO | 2010/033125 A1 | 3/2010 |
| WO | 2019/072267 A2 | 4/2019 |

OTHER PUBLICATIONS

"Re-key or Re-issue an SSL Certificate," BeyondTrust Corporaiton, 2019, https://www.beyondtrust.com/docs/remote-support/how-to/sslcertificates/replace.htm.

* cited by examiner

*Primary Examiner* — Brandon S Hoffman
(74) *Attorney, Agent, or Firm* — Kilpatrick Townsend & Stockton LLP

(57) ABSTRACT

Certain aspects and features provide an automated process for a server switching from existing digital certificate that is expired or about to expire to a new digital certificate signed by a trusted certificate authority (CA). During initiation of an encrypted communication session, for example, during a transport layer security (TLS) handshake, upon receiving a client hello message, the server determines whether it is using a renewable digital certificate. If so, the server automatically creates and sends a certificate signing request; receives a new, CA-signed digital certificate; and replaces the existing digital certificate in its key store with the new digital certificate. The server then includes the new digital certificate in the server hello message sent back to the client to establish the encrypted communication session.

20 Claims, 6 Drawing Sheets

US 11,283,629 B2

AUTOMATED REPLACEMENT OF RENEWABLE SERVER CERTIFICATES

TECHNICAL FIELD

The present disclosure relates generally to cryptographic security for Internet communications. More specifically, but not by way of limitation, this disclosure relates to automatically generating and submitting, for renewal purposes, a certificate signing request to obtain a digital certificate from a trusted certificate authority to authenticate a server's public encryption key.

BACKGROUND

Transport Layer Security (TLS) encrypts data sent over the Internet to ensure that eavesdroppers and hackers are unable to obtain information from Internet communications. TLS is one example of a cryptographic protocol that provides end-to-end security of data sent between applications over the Internet. These protocols use asymmetric cryptography for securely generating and exchanging a session key. Asymmetric cryptography uses a key pair—a public key, and a private key. A session key created using these two keys is then used for encrypting the data transmitted, and for decrypting the data received during a session. Once the session is over, the session key is discarded.

With such protocols, it is desirable that a client connecting to a server be able to validate ownership of the server's public key. This is normally undertaken using a digital certificate issued by a trusted third party known as a certificate authority (CA), which asserts the authenticity of the public key. A digital certificate issued by a CA expires at a specific time (on a specific date) set by the CA, or agreed upon by the CA and the customer. Internet industry groups typically require that a digital certificate expire no more than two years from its issuance.

DETAILED DESCRIPTION

Figure 1:
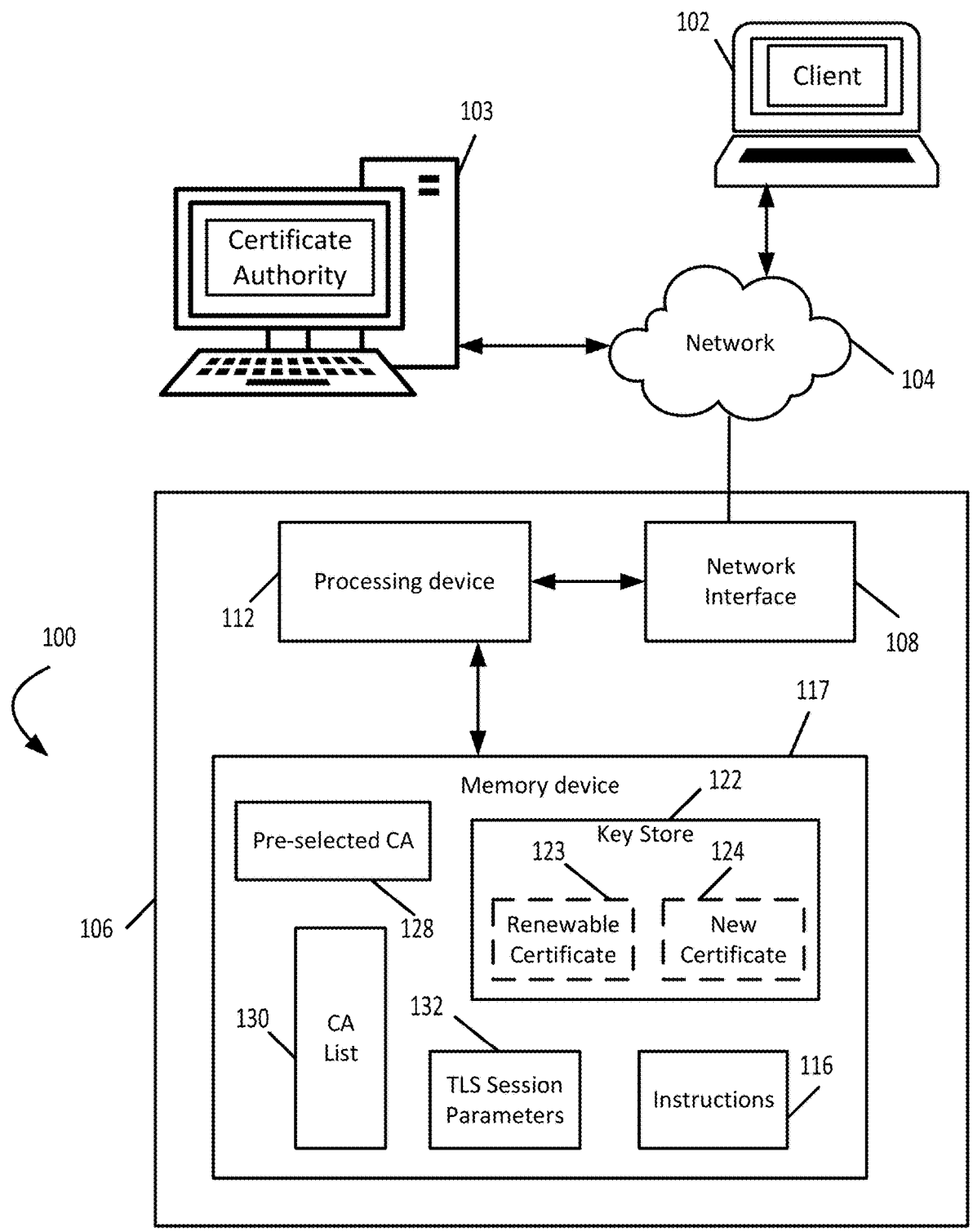
FIG. 1 is a block diagram of an example of a system that provides automated replacement of renewable server certificates according to at least some aspects of the disclosure.

A digital certificate for a server's public encryption key, signed by a trusted certificate authority, is only valid for a certain period of time. At the end of this period, the certificate expires, requiring the owner of the certificate to obtain a new certificate. When a server's certificate is expired, browsers present a warning, requiring end users to manually confirm whether or not to accept the server's certificate. This results in a security risk for end users since they are often prone to just accepting certificates. The users who accept expired digital certificates are vulnerable to server impersonation attacks.

Typically, in order to ensure a server always has a valid, signed certificate, a server administrator keeps track of when the server's certificate is due to expire, obtains a new certificate from a trusted certificate authority (CA) just prior to that time, and updates the server configuration to make use of the newly-obtained, signed certificate. The process of obtaining a new certificate from a trusted CA involves creating a certificate signing request (CSR), submitting the CSR to a trusted certificate authority (CA), and proving ownership of the domain names being requested in the CSR. The number of steps required makes this a time-consuming and often complex task for server administrators. It is easy for a server administrator to forget to obtain a new certificate prior to the existing certificate's expiration date.

Some examples of the present disclosure overcome one or more of the issues mentioned above by providing an automated process for switching from an expired or an about to expire, existing digital certificate to a new digital certificate. During a handshake to initiate an encrypted communication session, the server retrieves a certificate from a key store. When the retrieved certificate is renewable, either because it is expired or is about to expire, it is not simply sent to the client so that the handshake can continue as normal. Rather, the server automatically creates and submits a CSR, receives a new CA-signed digital certificate with a new expiration date and time, and replaces the renewable digital certificate in its key store with the new CA-signed digital certificate. Automating this task relieves server administrators from keeping track of digital certificate expirations. It also improves security for any server. A working Internet connection for the CSR and response messaging is almost guaranteed since the session initiation would not be detected without Internet connectivity. Thus, renewal attempts are not delayed due to down Internet connections and do not use computing resources outside the initiation process.

In some examples, a processing device coupled to a memory in a server executes instructions for causing the processing device to access, upon initiation of an encrypted communication session between a server and a client, an existing digital certificate corresponding to a public key assigned to the server and detect an expiration time for the existing digital certificate. The processing device generates a certificate signing request and sends the certificate signing request to a certificate authority (CA) based on the expiration time indicating that the existing digital certificate is a renewable digital certificate. The processing device receives a new digital certificate from the CA in response to the certificate signing request. The new digital certificate authenticates the public key assigned to the server just like the existing digital certificate, but the new digital certificate carries an expiration time set some distance in the future, typically in accordance with CA policy or an agreement between the CA and the server administrator. The processing device then replaces the existing digital certificate in the key store for the server with the new digital certificate.

In some examples, the certificate authority is pre-selected by a server administrator from a list of available certificate authorities that can authenticate a domain electronically and provide a signed digital certificate almost immediately. In some examples, a current time being past the expiration time indicates that the existing digital certificate is a renewable digital certificate. In some examples the current time being within a pre-selected period of the expiration time or being past the expiration time indicates that the existing digital certificate is a renewable digital certificate. In some examples, the cryptographic communication session is a TLS session, which is initiated when the server receives a message from a client indicating the client's identity and that a TLS session is being requested. As an example, such a message is sometimes referred to as a client hello message. The server retrieves the existing digital certificate from the key store. If the existing digital certificate is current, the server sends a response to the client accepting the request and providing the existing digital certificate. As an example, such a response is sometimes referred to as a server hello message. Otherwise, if the existing digital certificate is renewable, the server obtains a new digital certificate from the CA and includes the new digital certificate in the response to complete the TLS initiation.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 in which automated replacement of renewable server certificates takes place. System 100 includes a client computer 102, in this example, a laptop or notebook computer. Client computer 102 is connected to network 104, which in some examples is the Internet. Also connected to network 104 is a server 106. Server 106 provides encrypted connections over network 104, including TLS connections to client computer 102 using network interface 108. Server 106 includes processing device 112 can execute computer program code, also referred to as instructions or program code instructions 116, executable by the processing device 112 for performing operations of replacement of self-signed server certificates according to aspects of this disclosure. Processing device 112 is communicatively coupled to network interface 108 and to the memory device 117. The processing device 112 can include one processing device or multiple processing devices. Non-limiting examples of the processing device 112 include a field-programmable gate array (FPGA), an application-specific integrated circuit (ASIC), a microprocessor, etc. The processing device 112 can execute one or more operations for automated replacement of renewable server certificates as directed by program code instructions 116 stored in the memory device 117. The processing device 112 causes messages following a standard communication protocol to be sent through network interface 108 to other servers or clients running on network 104.

Still referring to FIG. 1, memory device 117 can include one memory device or multiple memory devices. The memory device 117 can be non-volatile and may include any type of memory device that retains stored information when powered off. In some examples, at least some of the memory device can include a non-transitory computer-readable medium from which the processing device 112 can read instructions 116. A computer-readable medium can include electronic, optical, magnetic, or other storage devices capable of providing the processing device with computer-readable instructions 116 or other program code. Non-limiting examples of the memory device 117 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions. Although FIG. 1 depicts a certain arrangement of components for illustrative purposes, other examples can include any number and combination of these components arranged in any suitable configuration.

Continuing with FIG. 1, memory device 117 includes key store 122 configured with digital certificates, which may include at various times, renewable digital certificate 123 or new digital certificate 124. A renewable digital certificate is an existing digital certificate that is either expired or will expire within some pre-selected time period. A new digital certificate is one that has been acquired relatively recently, at least recently enough so that its expiration time is beyond the pre-selected time period. In most cases, at issuance, the new digital certificate's expiration time would be months away. For purposes of the examples herein, a current time or an expiration time includes a date and a time on that date. Memory device 117 also includes the pre-selected certificate authority 128 and a list 130 of certificate authorities to choose from should an administrator need to select a different automated CA to provide a digital certificate. Memory device 117 in this example also stores session parameters 132, which include the identifiers and status of clients participating in communication sessions at any given time.

Figure 2:
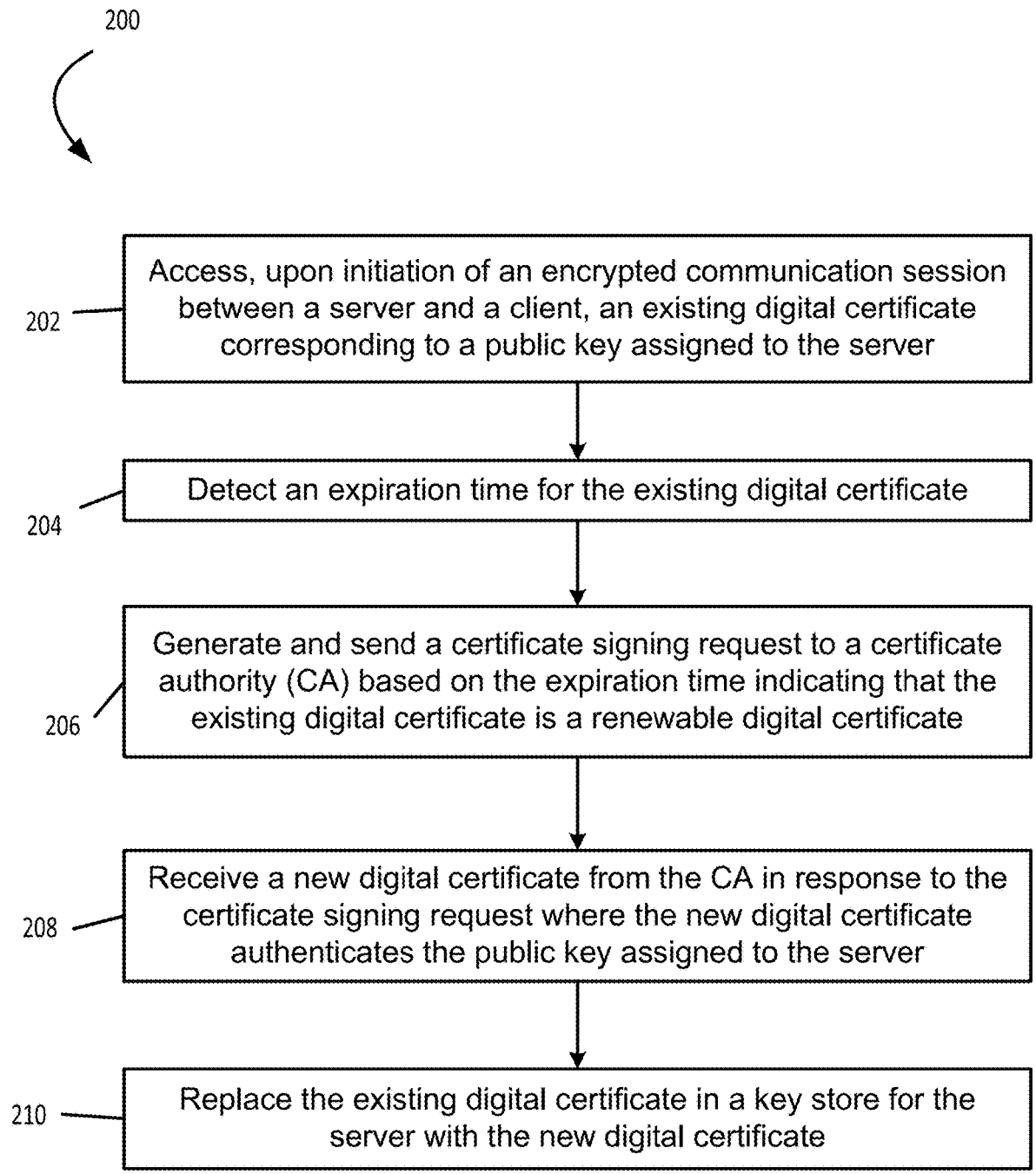
FIG. 2 is a flowchart of an example of a process of automated replacement of renewable server certificates according to at least some aspects of the disclosure.

In some examples, a processing device (e.g., processing device 112) can perform one or more of the operations shown in FIG. 2 to provide automated replacement of renewable server certificates according to some aspects of the disclosure. In other examples, the processing device can implement more operations, fewer operations, different operations, or a different order of the operations depicted in FIG. 2. Process 200 of FIG. 2 is described below with reference to components discussed above. At block 202, processing device 112 accesses an existing digital certificate corresponding to a public key assigned to the server. The processing devices access the existing digital certificate when an encrypted communication session is initiated between the server and the client. At block 204, processing device 112 detects an expiration time for the existing digital certificate. When the expiration time indicates that the existing digital certificate is renewable, processing device sends, at block 206, over the network interface 108, a certificate signing request to a CA. The certificate signing request is generated using information from the existing digital certificate. The request is then processed by CA server 103. At block 208, server 106 receives, in response to the certificate signing request, a new digital certificate authenticating the public key assigned to the server. At block 210, processing device 112 replaces the existing digital certificate in the key store 122 in memory device 117 with the new digital certificate, which can then be included in the handshake response.

In at least some examples, in order for the process described above to work in an automated fashion, an automated CA is used. An automated CA can provide signed digital certificates by automatically verifying ownership of the domain for the server making the request. There are number of ways the CA can validate a domain. As one example, the CA server may ask the domain server to provision a DNS record under its domain or provision an HTTP resource, either one of which can be done automatically. The CA server can then provide a token to the domain server. The domain server can make use of this token along with a key fingerprint to provision the resource. The CA can then access the provisioned resource and verify that it contains the expected content based on the token that was given.

The process described above of automatically replacing a renewable certificate at session initiation can be applied to any cryptographic protocol, as digital certificates are not protocol specific. TLS has already been mentioned. As another example, the process can also be applied to the secure sockets layers (SSL) protocol. The following examples illustrate the process with TLS.

Figure 3:
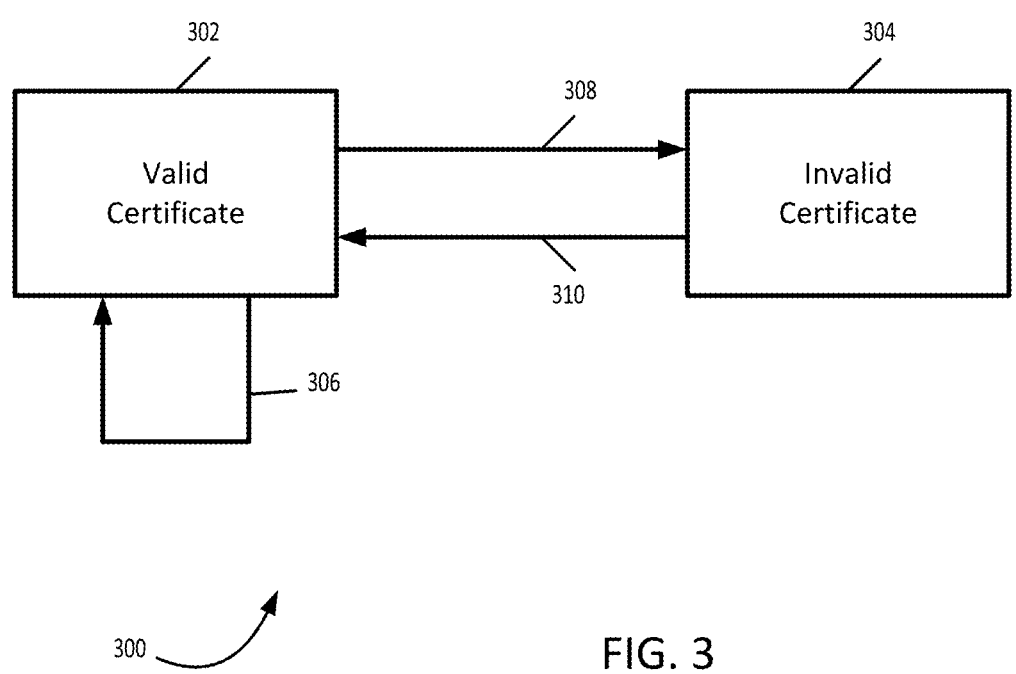
FIG. 3 is a state diagram illustrating an example of automated replacement of renewable server certificates according to at least some aspects of the disclosure.

FIG. 3 is a state diagram 300 that illustrates an example of two states that a server can exist in according to some aspects of the present disclosure. These two states can include a valid certificate state 302, and an invalid certificate state 304. If the server's digital certificate is not expired, the server is in valid certificate state 302. From the valid certificate state, the server, according to some aspects, can proactively renew its digital certificate as indicated by transition 306 and remain in the valid certificate state 302, thus preventing itself from entering invalid certificate state 304. When the server's digital certificate expires, the server transitions to the invalid certificate state 304 as illustrated by transition 308. When the server renews a certificate while in the invalid certificate state 304, the server self-transitions back to the valid certificate state 302 as illustrated by transition 310. When the server presents its digital certificate during a TLS handshake, the server determines whether it is in the invalid certificate state 304 or the valid certificate state 302 but being accessed at a time at which the certificate should be renewed to maintain the valid certificate state. It should be noted that a server can be configured so that it only obtains a new certificate when the existing certificate is actually expired.

Figure 4:
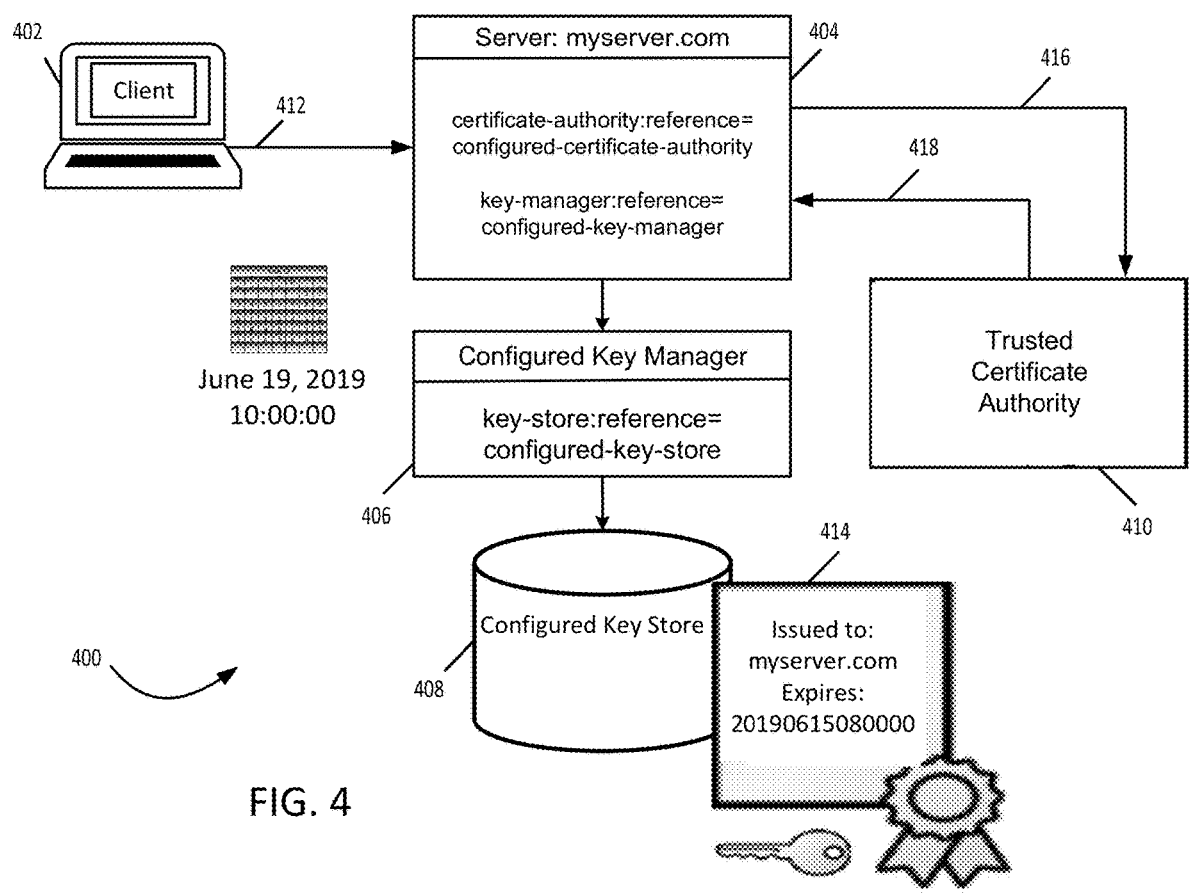
FIGS. 4, 5, and 6 are entity flow diagrams showing examples of automated replacement of a renewable server certificate according to some aspects of the disclosure.

FIG. 4 is an entity flow diagram showing an example of the initiation of a TLS session and action upon detection of an expired digital certificate. System 400 includes client 402, server 404, configured key manager 406, configured key store 408, and trusted certificate authority 410. Server 404 references configured key manager 406, which in turn references configured key store 408. The server resides at myserver.com and is configured to use the pre-selected CA 410 using a certificate-authority:reference tag. The configured key manager 406 is configured to use configured key store 408 using a key-store:reference tag. When client hello message 412 is received by server 404 on Jun. 19, 2019 at 10:00:00, upon detecting that existing digital certificate 414 issued for myserver.com is expired because it has an expiration time of Jun. 15, 2019 at 08:00:00, server 404 generates and sends a CSR message 416 and receives a CA-signed digital certificate message 418 from the configured, trusted CA. The new digital certificate supplied by CA 410 will have a time of expiration approximately six months in the future, as will be discussed below with respect to FIG. 5.

Figure 5:
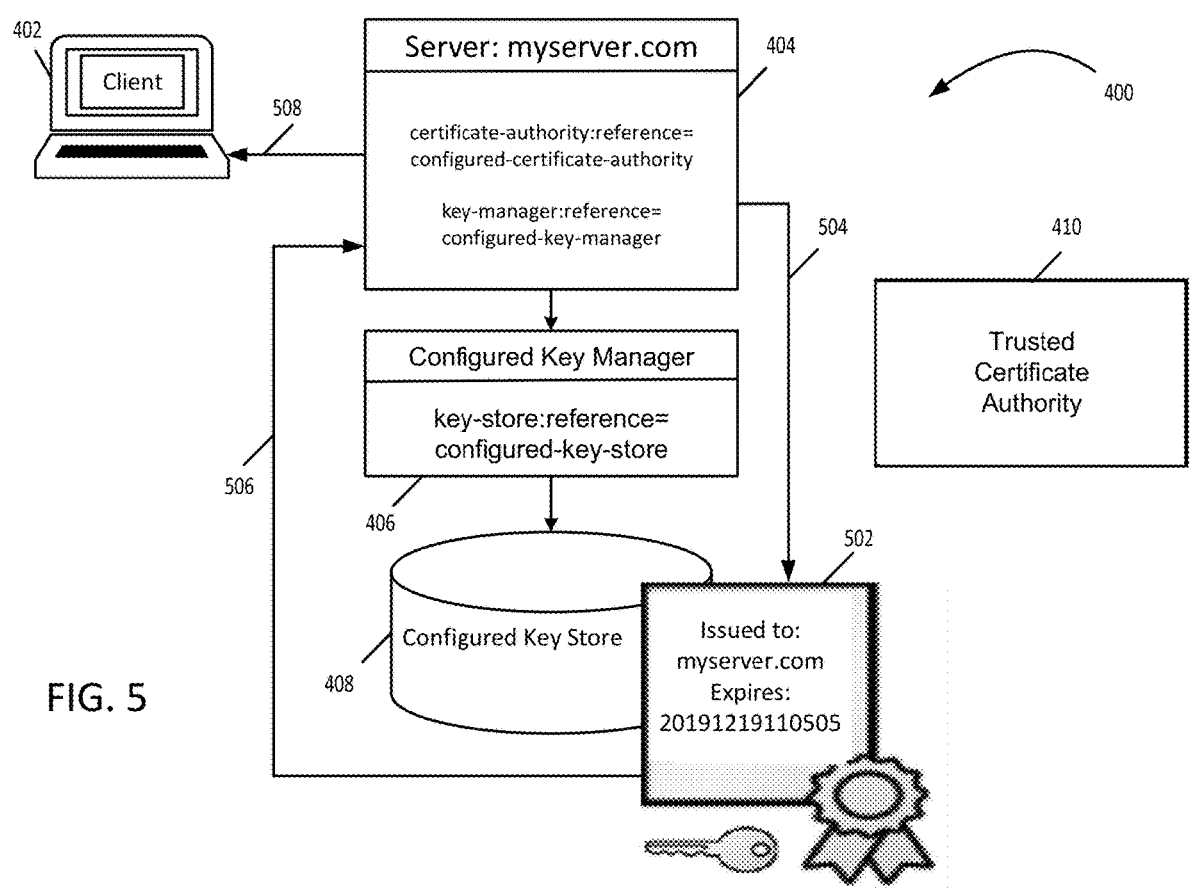

FIG. 5 is an entity flow diagram showing an example of further actions related to the establishment of the TLS session. In this example, the actions shown in FIG. 5 occur after the messaging shown in FIG. 4 has taken place. New digital certificate 502 is placed by server 404 into configured key store 408. The digital certificate 502 is also routed back into the TLS initiation process as shown by internal signaling paths 504 and 506. Server hello message 508 is then sent to client 402. Server hello message 508 includes the new, CA-signed digital certificate 502, issued by trusted certificate authority 410. The new digital certificate has an expiration time of 11:05:05 on Dec. 19, 2019.

In FIGS. 4 and 5, the server 404 automatically detects that its certificate is expired and automatically obtains a new, signed, digital certificate from the configured trusted certificate authority 410 as shown in FIG. 4. Server 404 was in invalid certificate state 304 when the TLS handshake was initiated, and self-transitioned to valid certificate state 302, as shown in FIG. 5.

Figure 6:
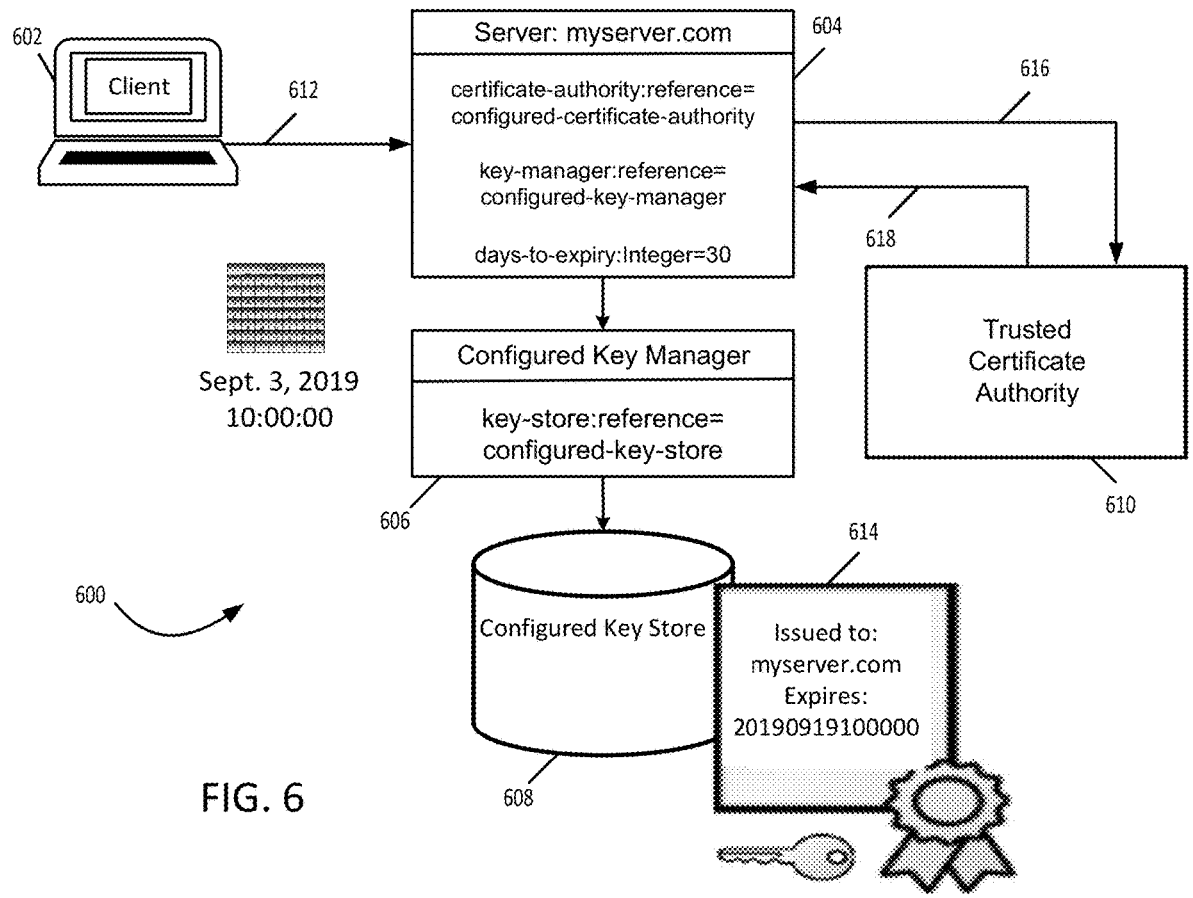

FIG. 6 is an entity flow diagram showing an example of the initiation of a TLS session and action upon detection of an existing digital certificate that will expire soon. System 600 includes client 602, server 604, configured key manager 606, configured key store 608, and trusted certificate authority 610. Server 604 references configured key manager 606, which in turn references configured key store 608. The configured key manager 606 is configured to use configured key store 608 using a key-store:reference tag. The server resides at myserver.com and is configured to use the pre-selected CA 610 using a certificate-authority:reference tag. Server 604 is also configured with pre-selected time period that determines how close to expiration the existing digital certificate must be in order for server 604 to automatically obtain a new digital certificate from trusted certificate authority 610. In this example, the period is 30 days, and is set by the days-to-expiry:Integer=30 tag.

Still referring to FIG. 6, when client hello message 612 is received by server 604 on Sep. 3, 2019 at 10:00:00, upon detecting that existing digital certificate 614 issued to myserver.com is expiring within the pre-selected time period of 30 days (the existing digital certificate has an expiration time of Sep. 19, 2019 at 10:00:00), server 604 generates and sends a CSR message 616 and receives a CA-signed digital certificate message 618 from the configured, trusted CA 610. The new digital certificate supplied by CA 610 will have a time of expiration approximately six months in the future, on Mar. 19, 2020, and the TLS handshake will be completed with the new digital certificate with messaging similar to that shown in FIG. 5 for the expired digital certificate case. Server 604 thus extends its valid certificate state and is prevented from entering the invalid certificate state at the expiration date of its existing digital certificate.

Unless specifically stated otherwise, it is appreciated that throughout this specification that terms such as "operations," "processing," "computing," "accessing," and "determining" or the like refer to actions or processes of a computing device, such as one or more computers or a similar electronic computing device or devices that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Terms such as "less" or "more," "before," or "after" when referring to numerical or time-based comparisons can encompass the concept of equality.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. Some examples can be combined with other examples to yield further examples.

The invention claimed is:
1. A server comprising:
a processing device; and
a memory device including instructions that are executable by the processing device for causing the processing device to perform operations comprising:
accessing, upon initiation of an encrypted communication session between the server and a client, an existing digital certificate corresponding to a public key assigned to the server;

detecting an expiration time for the existing digital certificate;

generating a certificate signing request for a certificate authority (CA) based on the expiration time indicating that the existing digital certificate is a renewable digital certificate;

receiving a validation request from the CA;

provisioning, in response to the validation request, a record or resource configured to verify a domain name of the server to the CA;

receiving a new digital certificate from the CA in response to provisioning the resource or record, the new digital certificate authenticating the public key assigned to the server; and replacing the existing digital certificate in a key store for the server with the new digital certificate.

2. The server of claim 1 wherein the instructions are executable for causing the processing device to perform an operation of accessing the CA from a list comprising a plurality of available certificate authorities.

3. The server of claim 1 wherein the operation of generating a certificate signing request for the CA based on the expiration time indicating that the existing digital certificate is a renewable digital certificate further comprises detecting a current time being past the expiration time of the existing digital certificate.

4. The server of claim 1 wherein the operation of generating a certificate signing request for the CA based on the expiration time indicating that the existing digital certificate is a renewable digital certificate further comprises detecting a current time being within a pre-selected period of the expiration time of the existing digital certificate.

5. The server of claim 1 wherein the instructions are executable for causing the processing device to perform operations comprising:

receiving a message from the client to initiate the encrypted communication session;

based on receiving the message, retrieving the existing digital certificate from the key store; and sending a response to the message to the client, the response being for establishing the encrypted communication session.

6. The server of claim 5 wherein the response includes the existing digital certificate when the expiration time indicates that the existing digital certificate is not a renewable digital certificate.

7. The server of claim 5 wherein the response includes the new digital certificate when the expiration time indicates that the existing digital certificate is a renewable digital certificate.

8. A method comprising:

accessing, by a processor, upon initiation of an encrypted communication session between a server and a client, an existing digital certificate corresponding to a public key assigned to the server;

detecting, by the processor, an expiration time for the existing digital certificate;

generating, by the processor, a certificate signing request for a certificate authority (CA) based on the expiration time indicating that the existing digital certificate is a renewable digital certificate;

receiving, by the processor, a validation request from the CA;

provisioning, by the processor, in response to the validation request, a record or resource configured to verify a domain name of the server to the CA;

receiving, by the processor a new digital certificate from the CA in response to provisioning the resource or record, the new digital certificate authenticating the public key assigned to the server; and replacing, by the processor, the existing digital certificate in a key store for the server with the new digital certificate.

9. The method of claim 8 wherein the certificate authority is pre-selected by a server administrator from a plurality of available certificate authorities.

10. The method of claim 8 wherein a current time being past the expiration time indicates that the existing digital certificate is a renewable digital certificate.

11. The method of claim 8 wherein a current time being within a pre-selected period of the expiration time indicates that the existing digital certificate is a renewable digital certificate.

12. The method of claim 8 further comprising:

receiving a message from the client to initiate the encrypted communication session;

based on receiving the message, retrieving the existing digital certificate from the key store; and sending a response to the message to the client, the response being for establishing the encrypted communication session.

13. The method of claim 12 wherein the response includes the existing digital certificate when the expiration time indicates that the existing digital certificate is not a renewable digital certificate.

14. The method of claim 12 wherein the response includes the new digital certificate when the expiration time indicates that the existing digital certificate is a renewable digital certificate.

15. A non-transitory computer-readable medium comprising program code that is executable by a processing device for causing the processing device to:

access, upon initiation of an encrypted communication session between a server and a client, an existing digital certificate corresponding to a public key assigned to the server;

detect an expiration time for the existing digital certificate;

generating a certificate signing request for a certificate authority (CA) based on the expiration time indicating that the existing digital certificate is a renewable digital certificate;

receive a validation request from the CA;

provision, in response to the validation request, a record or resource configured to verify a domain name of the server to the CA;

receive a new digital certificate from the CA in response to provisioning the resource or record, the new digital certificate authenticating the public key assigned to the server; and replace the existing digital certificate in a key store for the server with the new digital certificate.

16. The non-transitory computer-readable medium of claim 15 wherein the program code is executable for causing the processing device to access the certificate authority from a list comprising a plurality of available certificate authorities.

17. The non-transitory computer-readable medium of claim 15 wherein the program code for causing the processing device to generate a certificate signing request for the CA based on the expiration time indicating that the existing digital certificate is a renewable digital certificate further comprises code to detect a current time being past the expiration time of the existing digital certificate.

18. The non-transitory computer-readable medium of claim 15 wherein the program code for causing the processing device to generate a certificate signing request for the CA based on the expiration time indicating that the existing digital certificate is a renewable digital certificate further comprises code to detect a current time being within a pre-selected period of the expiration time of the existing digital certificate.

19. The non-transitory computer-readable medium of claim 15 further comprising program code that is executable for causing the processing device to:
   receive a message from the client to initiate the encrypted communication session;
   based on receiving the message, retrieve the existing digital certificate from the key store; and
   send a response to the message to the client, the response being for establishing the encrypted communication session.

20. The non-transitory computer-readable medium of claim 19 wherein the response includes the existing digital certificate when the expiration time indicates that the existing digital certificate is not a renewable digital certificate and the response includes the new digital certificate when the expiration time indicates that the existing digital certificate is a renewable digital certificate.

* * * * *